(12) United States Patent
Reimer et al.

(10) Patent No.: US 12,032,211 B1
(45) Date of Patent: Jul. 9, 2024

(54) LARGE MODE COUPLER

(71) Applicant: HyperLight Corporation, Cambridge, MA (US)

(72) Inventors: Christian Reimer, Wellesley, MA (US); Mian Zhang, Cambridge, MA (US); Kevin Luke, Cambridge, MA (US); Prashanta Kharel, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 17/503,078

(22) Filed: Oct. 15, 2021

Related U.S. Application Data

(60) Provisional application No. 63/093,681, filed on Oct. 19, 2020.

(51) Int. Cl.
*G02B 6/30* (2006.01)
(52) U.S. Cl.
CPC .................... *G02B 6/305* (2013.01)
(58) Field of Classification Search
CPC . G02B 6/14; G02B 6/305; G02B 2006/12152
See application file for complete search history.

(56) References Cited

U.S. PATENT DOCUMENTS

| | | | |
|---|---|---|---|
| 5,799,119 A | 8/1998 | Rolland | |
| 6,853,793 B1 | 2/2005 | Van Der Vliet | |
| 7,155,088 B2 | 12/2006 | Thapliya | |
| 7,251,406 B2 | 7/2007 | Luo | |
| 7,333,691 B1 | 2/2008 | Gill | |
| 8,600,198 B2 | 12/2013 | Sudo | |
| 9,759,982 B2 | 9/2017 | Feng | |
| 9,778,417 B2 | 10/2017 | Cherchi | |
| 9,939,709 B2 | 4/2018 | Iwatsuka | |

(Continued)

FOREIGN PATENT DOCUMENTS

| | | |
|---|---|---|
| CN | 109633608 | 4/2019 |
| CN | 111736403 | 2/2022 |

(Continued)

OTHER PUBLICATIONS

Search Report from corresponding International Application No. PCT/US2020/070252, dated Oct. 22, 2020.

(Continued)

*Primary Examiner* — Michael P Mooney
(74) *Attorney, Agent, or Firm* — Van Pelt, Yi & James LLP (57) ABSTRACT

An optical device configured to be coupled with an optical fiber is described. The optical device includes a waveguide, a low-confinement waveguide, and a low-confinement layer. The waveguide includes a high-confinement waveguide, which has a first index of refraction. The low-confinement waveguide is optically coupled with the high-confinement waveguide. At least a portion of the low-confinement waveguide has a second index of refraction less than the first index of refraction. The low-confinement waveguide has a thickness of at least a mode diameter in a portion of the optical fiber. The low-confinement layer is adjacent to a portion of the low-confinement waveguide. The low-confinement layer has a third index of refraction less than the second index of refraction.

20 Claims, 6 Drawing Sheets

(56) References Cited

U.S. PATENT DOCUMENTS

| | | | |
|---|---|---|---|
| 11,181,760 B2 | 11/2021 | Zhang | |
| 2004/0037497 A1* | 2/2004 | Lee | G02B 6/132 385/28 |
| 2004/0151423 A1 | 8/2004 | Izhaky | |
| 2009/0142019 A1 | 6/2009 | Popovic | |
| 2011/0262071 A1 | 10/2011 | Mitomi | |
| 2011/0317956 A1* | 12/2011 | Sudo | G02F 1/2257 438/31 |
| 2012/0027337 A1 | 2/2012 | Kondou | |
| 2015/0260916 A1 | 9/2015 | Cherchi | |
| 2015/0293427 A1 | 10/2015 | Goi | |
| 2017/0351025 A1 | 12/2017 | Trita | |
| 2018/0211685 A1 | 7/2018 | Mehfuz | |
| 2021/0325607 A1 | 10/2021 | Oka | |

FOREIGN PATENT DOCUMENTS

| | | |
|---|---|---|
| JP | 6476876 | 3/2019 |
| WO | 2018031916 | 2/2018 |

OTHER PUBLICATIONS

Extended European Search Report for Application 20836102.2, dated Jun. 21, 2023 (Year: 2023).

\* cited by examiner

LARGE MODE COUPLER

CROSS REFERENCE TO OTHER APPLICATIONS

This application claims priority to U.S. Provisional Patent Application No. 63/093,681 entitled LARGE MODE COUPLER filed Oct. 19, 2020 which is incorporated herein by reference for all purposes.

BACKGROUND OF THE INVENTION

Optical fibers are often used to transmit optical signals to or from optical devices. The end of the optical fiber is aligned and optically coupled to a waveguide for the optical device at a facet (i.e. edge) of the optical device. Once aligned and connected, optical signals can be transmitted between the waveguide and the optical fiber. However, optical fibers are frequently significantly larger in size than the waveguides used in optical components. Thus, the mode size for the optical signal is larger in the optical fiber. Because of this difference in size, alignment and efficient transmission of an optical signal between a high index of refraction waveguide and an optical fiber may be challenging.

A conventional technique for addressing the mode size difference is an inverse taper in the waveguide for the optical device. For an inverse taper, the width of the waveguide decreases in direction of transmission of the optical signal. Thus, the portion of the waveguide closer to the facet is narrower than a portion of the waveguide further from the facet. The mode to increases in size closer to the facet. However, the increase in mode size may still be insufficient to adequately improve transmission between the waveguide and the optical fiber. Other mechanisms for improving the match of mode size also have disadvantages, such as fabrication complexity and/or poor performance. Consequently, an improved mechanism for coupling photonic devices to optical fibers is desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Optical fibers are often used to transmit optical signals to or from other integrated optical components. In order to do so, the optical fiber is aligned and optically coupled to a micrometer scale waveguide carrying the optical signal. For example, the end of an optical fiber may be aligned with and connected to a facet for the waveguide. However, optical fibers are frequently significantly larger in size than the waveguides used in optical components. Thus, the mode size for the optical signal is larger in the optical fiber. For example, the mode for an optical fiber may have a diameter on the order of ten micrometers. Even if the optical fiber is tapered, the mode diameter at the tapered end may be approximately three micrometers in diameter. High index of refraction waveguides, such as lithium niobate (LN) waveguides, are typically small and highly effective at confining the mode. As such, the diameter of the mode carried by the high index of refraction waveguide is generally on the order of eight hundred to one thousand nanometers or less. This is significantly less than the three to ten micrometer diameter of the mode in the optical fiber. Because of this difference in size, alignment and efficient transmission of an optical signal between a high index of refraction waveguide and an optical fiber may be challenging.

Conventional methods for addressing the mode size difference include providing an inverse taper in the optical waveguide. For an inverse taper, the width of the waveguide decreases in direction of transmission of the optical signal. This causes the waveguide to at least partially reduce confinement of the optical signal. Thus, the optical signal spreads and the mode size increases. However, the increases in mode size may still be insufficient to adequately improve transmission between the waveguide and the optical fiber. Other mechanisms for improving the match of mode size, such as depositing a very thick layer of low index material on the waveguide near the facet, have significant drawbacks.

Such disadvantages may include fabrication complexity, compatibility and inadequate performance. Consequently, a simple and effective mechanism for coupling photonic devices to optical fibers is desired.

An optical device configured to be coupled with an optical fiber is described. The optical device includes a waveguide, a low-confinement waveguide, and a low-confinement layer. The waveguide includes a high-confinement waveguide, which has a first index of refraction. The low-confinement waveguide is optically coupled with the high-confinement waveguide. At least a portion of the low-confinement waveguide has a second index of refraction less than the first index of refraction. The low-confinement waveguide has a thickness of at least a mode diameter in a portion of the optical fiber. In some embodiments, the low-confinement layer has a layer thickness of at least three multiplied by the mode diameter. The low-confinement layer is adjacent to a portion of the low-confinement waveguide. The low-confinement layer has a third index of refraction less than the second index of refraction.

In some embodiments, the waveguide includes a slab layer between the high-confinement waveguide and the low-confinement layer. The slab layer has a slab index of refraction greater than the second index of refraction. In some embodiments, the waveguide includes an inverse taper. Similarly, the low-confinement waveguide may include a taper. At least a portion of the low-confinement waveguide includes at least one of doped silicon oxide, silicon oxynitride, and titanium doped glass. The low-confinement layer may include at least one of quartz, silicon dioxide, fused silica, and doped fused silica. The high-confinement waveguide may include at least one of lithium niobate, lithium tantalate, silicon and silicon nitride.

An optical device includes an optical fiber and a mode converter. The optical fiber is configured to transmit an optical signal having a mode diameter in a portion of the optical fiber proximate to a mode converter. The mode converter is coupled to the optical fiber. The mode converter includes a waveguide and a low-confinement waveguide. The waveguide has a high-confinement waveguide and a slab layer. The high-confinement waveguide has a first index of refraction. At least a portion of the low-confinement waveguide is between the high confinement waveguide and a low-confinement layer. The low-confinement layer has a second index of refraction less than the first index of refraction. The low-confinement waveguide has a thickness of at least the mode diameter. The low-confinement waveguide includes a facet configured to be connected with the optical fiber. The low-confinement waveguide is aligned with an end surface of the optical fiber at the facet.

Providing the waveguide further includes providing a slab layer. The slab layer is between the high-confinement waveguide and the low-confinement waveguide. Providing the low-confinement waveguide further includes photolithographically defining a region in the low-confinement layer and treating the region in the low-confinement layer to modify the first index of refraction of the low-confinement layer. In some embodiments, the treating includes at least one of ion diffusion, ion implantation, and/or doping. Providing the low-confinement waveguide may further include laser writing a region in the low-confinement layer to modify the first index of refraction of the low-confinement layer. In some embodiments, providing the waveguide includes providing a layer on the low-confinement waveguide and defining the slab layer from the layer. Providing the waveguide may also include defining the high-confinement waveguide from the layer. In some embodiments, the low-confinement layer resides on a substrate. Providing the low-confinement waveguide may further include defining an additional portion of the low-confinement waveguide in the substrate. In some embodiments, providing the low-confinement waveguide further includes providing the low-confinement waveguide at a varying distance from the slab layer.

Figures 1A, 1B:
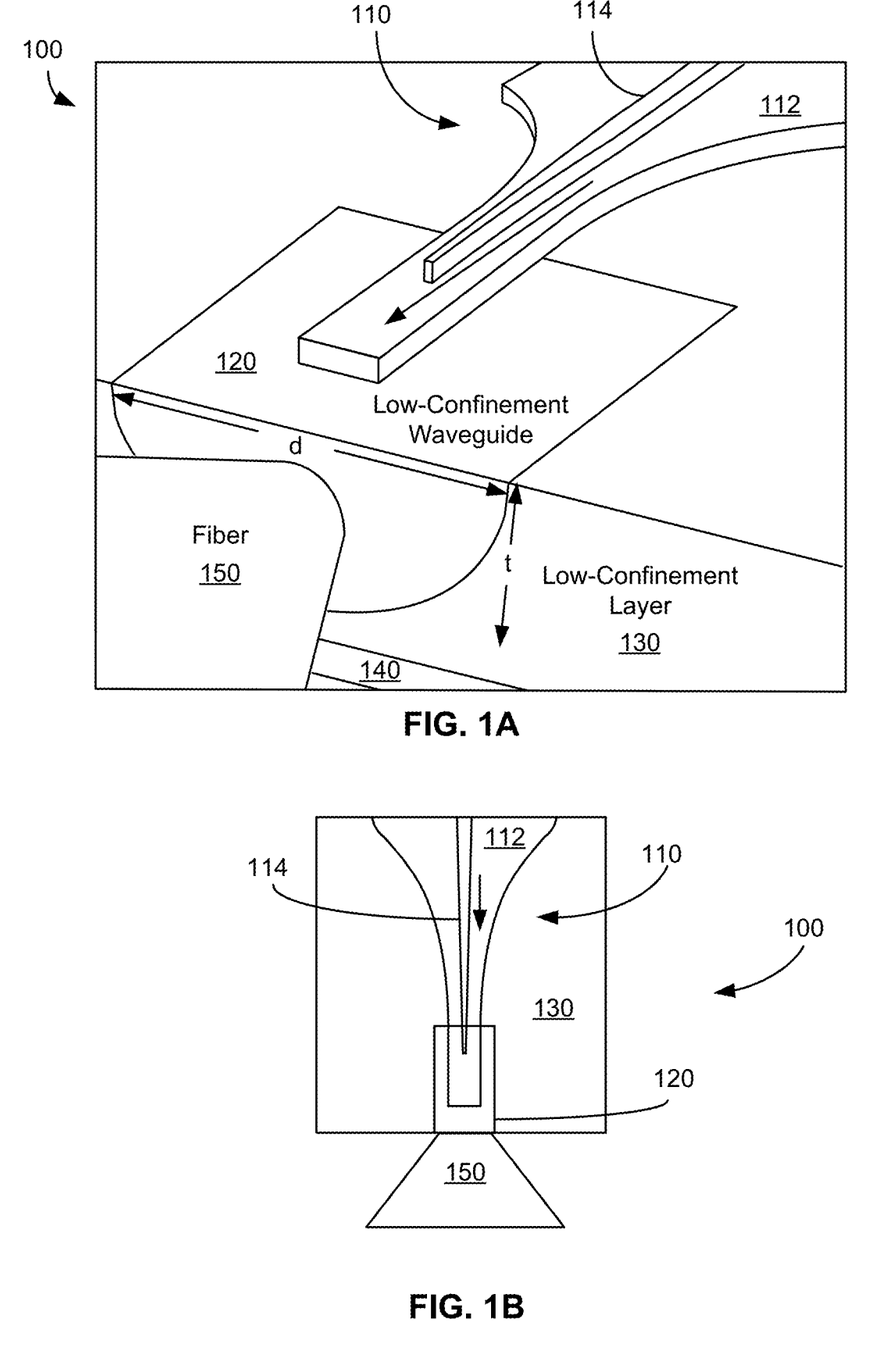
FIGS. 1A-1B are diagrams depicting perspective and top views of a portion of an embodiment of an optical device.

FIGS. 1A and 1B are diagrams depicting perspective and top views, respectively, of a portion of an embodiment of optical device 100. FIGS. 1A-1B are not to scale and only some portions of optical device 100 are shown and/or labeled. Also depicted in FIGS. 1A-1B is optical fiber 150 to which connection is desired to be made. In the embodiment shown, optical fiber 150 is tapered. Thus, the end of optical fiber 150 has a smaller diameter than the body of optical fiber 150. In some embodiments, tapered optical fiber 150 has a mode size on the order of three micrometers in diameter. An untapered optical fiber may be used in place of tapered optical fiber 150. Such an untapered optical fiber may have a mode size on the order of ten micrometers in diameter. Although described in the context of coupling with optical fiber 150, in some embodiments, optical device 100 may be used for other and/or additional purposes.

Optical device 100 includes waveguide 110, low-confinement waveguide 120, and low-confinement layer 130 in which low-confinement waveguide 102 is formed. Also shown is substrate 140 on which low-confinement layer 130 resides. Substrate 140 may include silicon, fused silica, quartz, sapphire, and/or another substrate. In some embodiments, substrate 140 may be omitted. Thus, low-confinement layer 130 may serve as a substrate for optical device 100 in such embodiments. Also not shown in FIGS. 1A-1B is a cladding layer residing on low-confinement layer 130, low-confinement waveguide 120, slab layer 112 and high-confinement waveguide 114. Such a cladding layer may include one or more materials and has an index of refraction that is less than the index of refraction of low-confinement waveguide 120.

Waveguide 110 is a high-confinement waveguide. Thus, waveguide 110 has a higher index of refraction than low-confinement layer 130 or the surrounding regions (e.g. air in the embodiment shown). For example, waveguide 110 may be formed of LN, lithium tantalate, Si, $Si_3N_4$, and/or other high index of refraction material. For example, the index of refraction of waveguide 110 may be at least 2 or at least 2.5 in some embodiments. Although components are described in the context of having "an" index of refraction, the index of refraction of a component may vary. In the embodiment shown, waveguide 110 includes slab layer 112 and high-confinement layer 114. In some embodiments, slab layer 112 may be omitted. In some embodiments, slab layer 112 and high-confinement layer 114 are formed of the same material, such as single crystal LN. In such embodiments, a single layer of LN may be etched to define slab layer 112 and high-confinement layer 114. In some embodiments, slab layer 112 and high-confinement layer 114 may be formed of different materials. Thus, slab layer 112 and high-confinement layer 114 may have different indices of refraction. High-confinement layer 114 may be viewed as the primary mechanism of transmission for waveguide 110. The unlabeled arrow in FIGS. 1A and 1B indicates the direction of transmission of the optical signal in optical device 100. Slab layer 112 may be used in providing the mode of the desired size, as described below. In some embodiments, waveguide 110 has a height of less than one micrometer.

Waveguide 110 has an inverse taper. Thus, high-confinement waveguide 114 narrows closer to optical fiber 150. Similarly, slab layer 112 narrows closer to optical fiber 150.

In other embodiments, waveguide 110 may be configured differently. In the embodiment shown, the inverse taper of waveguide 110 is shown as extending over low confinement waveguide 120. In some embodiments, inverse taper terminates before (e.g. does not overlap) low confinement waveguide 120. In the embodiment shown, slab layer 112 and high-confinement waveguide 114 overlap low-confinement waveguide 120. In some embodiments, high-confinement waveguide 114 and/or slab layer 112 terminates before crossing low-confinement waveguide 120.

Low-confinement layer 130 is an insulator having a lower index of refraction than waveguide 110. For example, low-confinement layer 130 may include $SiO_2$, fused silica, crystalline quartz, and/or other lower index of refraction material(s). For example, low-confinement layer 130 may have an index of refraction of less than 2, less than 1.5 and/or less than 1.4 in some embodiments. Low-confinement waveguide 120 also has an index of refraction that is lower than the index of refraction of waveguide 110. Stated differently, low-confinement waveguide 120 has one or more indices of refraction that are less than the index (or indices) of refraction of high-confinement layer 114 and/or slab layer 112. Low-confinement waveguide 120 also has an index (or indices) of refraction greater than the index (or indices) of refraction for low-confinement layer 130. For example, in some embodiments, low-confinement waveguide 120 may have an index of refraction that sis greater than 1.4 and less than 2.5. Thus, low-confinement waveguide 120 has an intermediate index of refraction between the index of refraction of high-confinement waveguide 112 and the index of refraction of low-confinement layer 130. For example, low-confinement waveguide 120 may include doped oxide, silicon oxynitride, titanium doped glass and/or lower index of refraction materials that have been treated by mechanisms that alter the properties of low-confinement layer 130 to increase the index of refraction. Thus, low-confinement waveguide 120 may be formed via doping, ion implantation, and/or ion diffusion. In some embodiments, low-confinement waveguide 120 may be formed by femto-second laser writing in low-confinement layer 130. The laser writing forms local defects that may be used to modify the index of refraction of low-confinement layer 130. In some embodiments, low-confinement waveguide 120 may be formed by etching, for example shallow etching, or adjusting the stoichiometry of the low-confinement layer 130 in another manner.

Slab layer 112, if present, is between low-confinement waveguide 120 (and thus low-confinement layer 130) and high-confinement waveguide 114. In the embodiment shown, low-confinement waveguide 120 is between waveguide 110 and substrate 140. Thus, during fabrication, low-confinement waveguide 120 and low-confinement layer 130 are formed prior to waveguide 110. In the embodiment shown, slab layer 112 also has an inverse taper. Thus, the width of slab layer 112 in proximity to fiber 150 (and the corresponding facet of optical device 1000 is less than the width of slab layer 112 further from fiber 150.

In operation, an optical signal traveling in waveguide 110 approaches optical fiber 150. Far from optical fiber 150, the mode for the optical signal is confined to high-confinement waveguide 114. As waveguide 110 narrows, high-confinement waveguide 114 partially loses confinement for the mode of the optical signal. Thus, slab layer 112 and high-confinement waveguide 114 carry the enlarged optical mode. However, the mode is still significantly smaller than desired for optical fiber 150. Consequently, low-confinement waveguide 120 is used.

Low-confinement waveguide 120 can also transmit the optical signal as the optical signal approaches the facet (the edge of device 100). Thus, the mode may be considered to move from waveguide 110 to low-confinement waveguide 120 while enlarging in size. As the optical signal traverses waveguide 110 and low-confinement waveguide 120, the mode size grows to more closely match the mode size for fiber 150 (e.g. a diameter of at least three micrometers and not more than ten micrometers in some embodiments). Through the use of low-confinement waveguide 120, a larger optical mode can be supported by optical device 100 for transmission between fiber 150 and optical device 100. Consequently, alignment of fiber 150 to the optical mode (and low-confinement waveguide 120) may be simplified and improved. Optical losses in transmission between low-confinement waveguide 120 and optical fiber 150 may be reduced. Thus, efficiency of optical fiber 150 and optical device 100 may be improved.

In order to maintain the larger-sized optical mode, low-confinement waveguide 120 may have a size (e.g. a thickness, t and, in some embodiments, a diameter, d) that is at least the diameter of the mode for optical fiber 150. Similarly, low-confinement layer 130 has a thickness that is at least the diameter of the mode for optical fiber 10. In some embodiments, the size of low-confinement waveguide 120 (and the thickness of low-confinement layer 130) is larger than the diameter mode for optical fiber 150. If substrate 140 has an index of refraction that is high compared to the index of refraction of low-confinement layer 130, then the size of low-confinement layer 130 in which low-confinement waveguide 120 is formed may be at least two to three multiplied by the diameter of optical fiber 150. For example, if substrate 140 is silicon and low-confinement layer 130 is glass, then the thickness of low-confinement layer 130 is at least two to three (or more) multiplied by the diameter of the mode for optical fiber 150. This thickness is on the order of nine through thirty micrometers for a mode diameter of three through ten micrometers in optical fiber 150. In some embodiments, the thicknesses of low-confinement layer 130 are desired to be significantly thicker, for example in excess of fifty micrometers in the example above. The large thicknesses for low-confinement layer 130 aid in reducing or eliminating the leakage of the optical signal from low-confinement waveguide 120 to a higher index of refraction substrate 140.

Optical device 100 has improved performance and manufacturability. Because of the presence of low-confinement waveguide 120, the mode size for optical device 100 may be closer to the mode size for optical fiber 150. Thus, alignment and transmission of the optical signal between optical fiber 150 and optical device 100 may be improved. Further, low-confinement layer 130 may either be part of the substrate or fabricated during front end processing. Similarly, low-confinement waveguide 120 may be formed relatively early in the fabrication process (e.g. prior to formation of waveguide 114). Consequently, growth of the relatively thick structures 120 and 130 may be simpler and faster. In addition, large structures 120 and 130 being below waveguide 110 (e.g. closer to and/or part of the substrate) may result in optical device 100 being more robust. Consequently, performance, manufacturability and reliability of optical device 100 may be improved.

Figure 2:
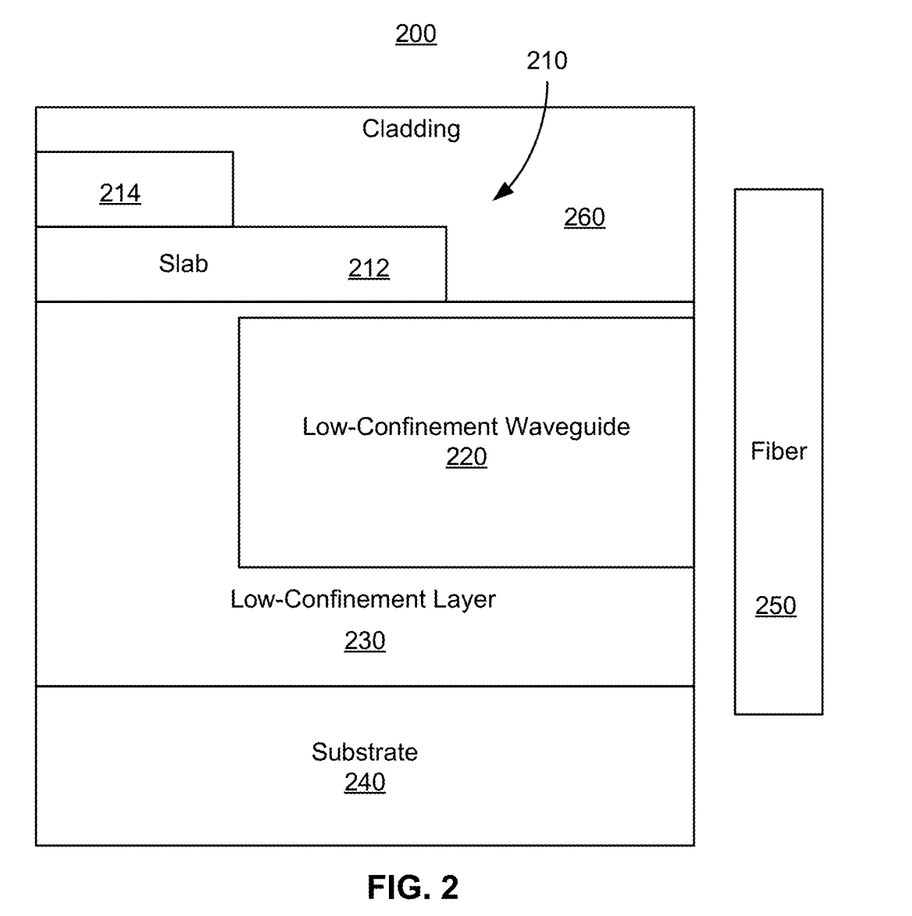
FIG. 2 is a diagram depicting a side view of a portion of an embodiment of an optical device.

FIG. 2 is a diagram depicting a side view of a portion of an embodiment of optical device 200. FIG. 2 is not to scale and only some portions of optical device 200 are shown and/or labeled. Also depicted in FIG. 2 is optical fiber 250 to which connection is desired to be made. In the embodiment shown, optical fiber 250 is untapered. Although described in the context of coupling with optical fiber 250, in some embodiments, optical device 200 may be used for other and/or additional purposes.

Optical device 200 is analogous to optical device 100. Optical device 200 includes waveguide 210 having high-confinement waveguide 214 and slab layer 212, low-confinement waveguide 220, low-confinement layer 230, and substrate 240 that are analogous to waveguide 110 having high-confinement waveguide 114 and slab layer 112, low-confinement waveguide 120, low-confinement layer 130 and substrate 140, respectively. In some embodiments, substrate 240 may be omitted. Thus, low-confinement layer 230 may serve as a substrate for optical device 200 in such embodiments. Also shown is cladding 260. In some embodiments, cladding 260 includes the same material(s) as low-confinement layer 230.

As can be seen in FIG. 2, low-confinement waveguide 220 is formed below (i.e. closer to substrate 240), and thus before waveguide 210. A portion of low-confinement waveguide 220 extends under slab layer 212. In some embodiments, a portion of low-confinement waveguide 220 may extend under high-confinement waveguide 214. Further, in the embodiment shown, a small portion of low-confinement layer 230 is between low-confinement waveguide 220 and slab layer 212. Thus, low-confinement waveguide 220 need not share an interface with waveguide 210. Although shown as having a constant depth (i.e. a constant distance from the surface of low-confinement layer 230), in some embodiments, the depth of low-confinement waveguide 220 may vary.

Optical device 200 operates in an analogous manner to optical device 100. Thus, inverse tapering of high-confinement waveguide 214 and slab layer 212 may increase the mode size. The use of low-confinement waveguide 220 may further increase the mode size. As can be seen in FIG. 2, use of the low-confinement waveguide 220 also allows fiber 250 to be aligned with low-confinement waveguide 220. In some embodiments, a larger fraction of fiber 250 is aligned with and coupled to thicker low-confinement layer 230. As such, the physical and optical connection between fiber 250 and optical device 200 may be improved. Consequently, alignment and transmission of optical signals between optical device 200 and fiber 250 may be improved. Further, manufacturability and robustness of optical device 200 may be improved.

Figure 3A:
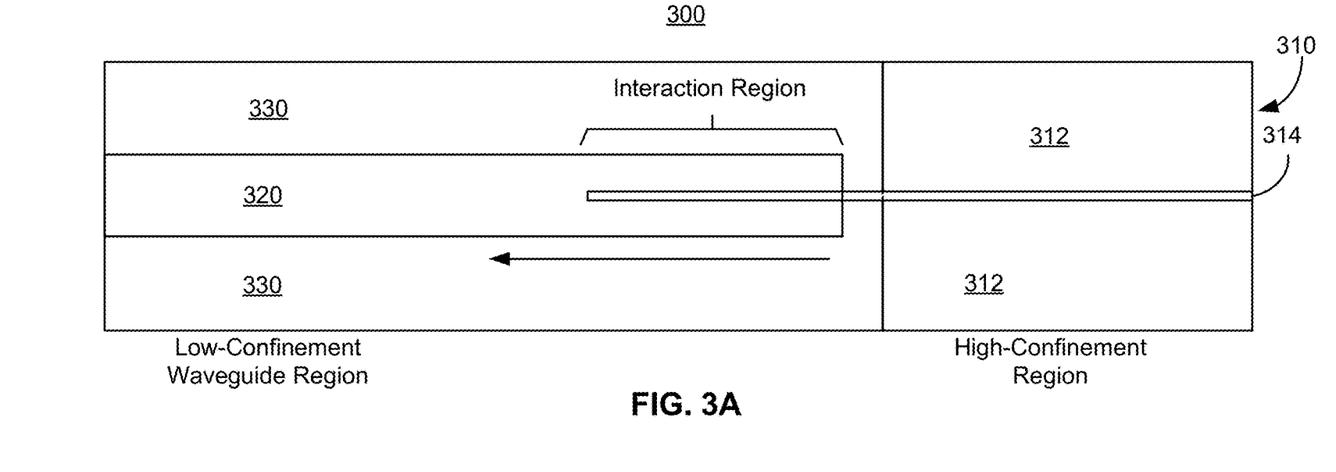
FIGS. 3A-3D are top and cross-sectional views of a portion of an embodiment of an optical device.
Figure 3B:
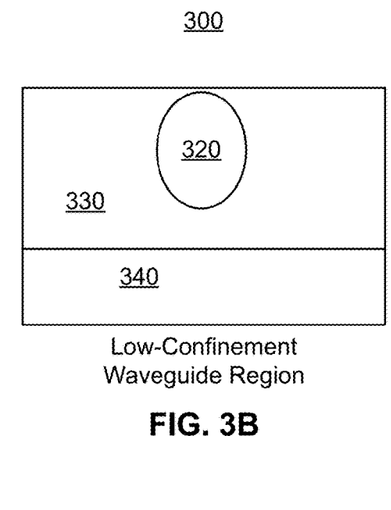
Figure 3C:
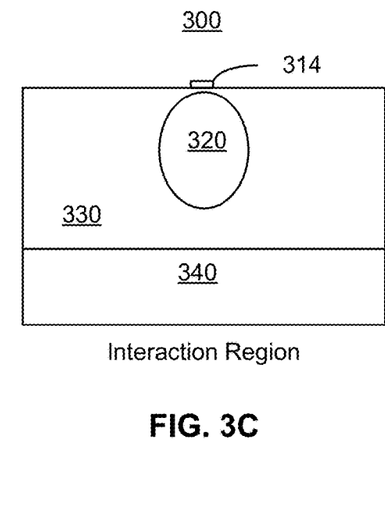
Figure 3D:
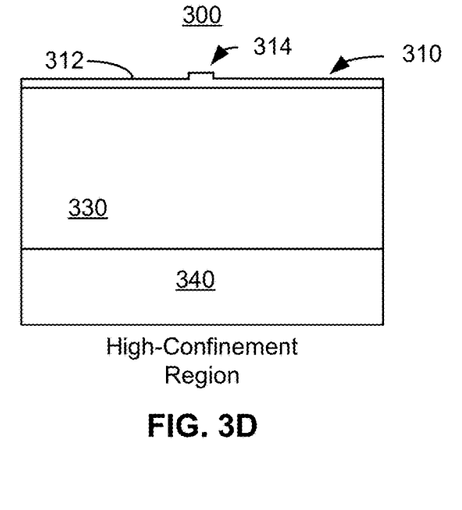

FIGS. 3A-3D are top and cross-sectional views of a portion of an embodiment of an optical device 300. FIG. 3A depicts a top view of optical device 300. FIGS. 3B, 3C, and 3D depict cross-sectional views of optical device 300 in the low-confinement waveguide region (near the facet at which an optical fiber may be coupled), the interaction region, and the high-confinement region, respectively. FIGS. 3A-3D are not to scale and only some portions of optical device 300 are shown and/or labeled. Optical device 300 is analogous to optical device(s) 100 and/or 200. Optical device 300 thus includes waveguide 310 having high-confinement waveguide 314 and slab layer 312, low-confinement waveguide 320, low-confinement layer 330 and (optionally) a substrate (not shown) that are analogous to waveguide 110 having high-confinement waveguide 114 and slab layer 112, low-confinement waveguide 120, low-confinement layer 130 and substrate 140, respectively. The direction of transmission of an optical signal being provided is depicted in FIG. 3A by the unlabeled arrow. Although not shown in FIGS. 3A-3B, optical device 300 generally includes cladding analogous to cladding 260 that resides on high confinement waveguide 314, slab layer 312, and/or low-confinement layer 330.

FIGS. 3A-3D indicate the three regions: the high-confinement region far from the fiber, an interaction region, and the low-confinement waveguide region closest to the coupling to the optical fiber. In the high confinement region of FIG. 3D, the optical mode is primarily within high-confinement waveguide 314. Slab layer 312 may be very wide in the high confinement region.

In the interaction region of FIG. 3C, the mode transfers at least partially from waveguide 310 to low-confinement waveguide 320. Also in interaction region, the mode size grows. The mode size may continue to grow as the optical signal moves from the interaction region toward the optical fiber (if present). In some embodiments, the mode becomes confined (e.g. transmitted) entirely in low-confinement waveguide 320. For example, in the low-confinement waveguide region of FIG. 3B, the mode may be entirely confined in low-confinement waveguide 320. Although shown as having an oval cross-section in FIGS. 3B-3D, in some embodiments, low-confinement waveguide 320 may have another cross-sectional shape. Although not indicated in FIG. 3A, in the interaction region, high-confinement waveguide 314 may undergo an inverse taper. Although not shown in the interaction region in FIGS. 3A and 3C, slab layer 312 may be present and may be tapered.

Thus, optical device 300 may be used to increase the size of the mode. This may be accomplished through the use of waveguide 320 having a low index contrast and large mode field diameter optimized for optical coupling in insulator (i.e. low-confinement) layer 330 and/or substrate layer below a high-confinement optical waveguide in a thin film.

Thus, optical device 300 functions in a manner analogous to optical devices 100 and 200. Thus, inverse tapering of waveguide 310 may increase the mode size. The use of low-confinement waveguide 320 may further increase the mode size. Consequently, alignment and transmission of optical signals between optical device 300 and fiber 350 may be improved. Further, manufacturability and robustness of optical device 300 may be improved.

FIGS. 4-9 depict cross-sectional views of embodiments of optical devices 400, 500, 600, 700, 800, and 900. FIGS. 4-9 are not to scale and only some portions of optical device 400, 500, 600, 700, 800, and 900 are shown and/or labeled. Optical devices 400, 500, 600, 700, 800, and 900 are analogous to optical device(s) 100, 200 and/or 300. For simplicity, the waveguide (i.e. high-confinement waveguide and slab layer) are not shown in FIGS. 4-9. In some embodiments, the waveguide remains above the low-confinement waveguide. In some embodiments, the waveguide is partially removed from (e.g. physically separated from) low-confinement waveguide. In some embodiments, the waveguide is completely removed from low-confinement waveguide (as shown in FIGS. 4-9). In some embodiments, the waveguide may be patterned in an inverse taper or in another manner.

Optical device 400 includes low-confinement waveguide 420, low-confinement layer 430 and optional substrate 440 that are analogous to low-confinement waveguide 120, low-confinement layer 130 and substrate 140, respectively. Optical device 500 includes low-confinement waveguide 520, low-confinement layer 530 and optional substrate 540 that are analogous to low-confinement waveguide 120, low-confinement layer 130 and substrate 140, respectively. Optical device 600 includes low-confinement waveguide 620, low-confinement layer 630 and optional substrate 640 that are analogous to low-confinement waveguide 120, low-confinement layer 130 and substrate 140, respectively. Optical device 700 includes low-confinement waveguide 720, low-confinement layer 730 and optional substrate 740 that are analogous to low-confinement waveguide 120, low-confinement layer 130 and substrate 140, respectively. Optical device 800 includes low-confinement waveguide 820 and low-confinement layer 830 that are analogous to low-confinement waveguide 120 and low-confinement layer 130, respectively. Although not shown in FIG. 8, optical device 800 may include a substrate analogous to substrate 140. Optical device 900 includes low-confinement waveguide 920, low-confinement layer 930 and optional substrate 940 that are analogous to low-confinement waveguide 120, low-confinement layer 130 and substrate 140, respectively. Also shown in FIG. 9 is cladding 960 analogous to cladding 260. Although not shown in FIGS. 4-8, optical devices 400, 500, 600, 700, and/or 800 may include cladding analogous to cladding 260.

Figure 4:
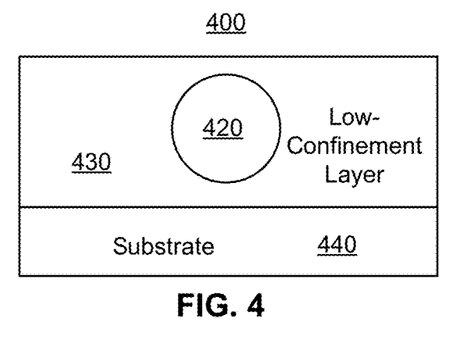
FIGS. 4-9 are diagrams depicting cross-sectional views of embodiments of optical devices.
Figure 5:
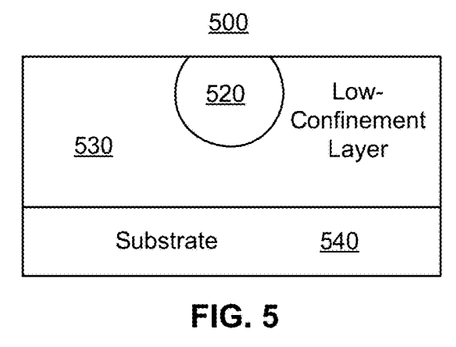
Figure 6:
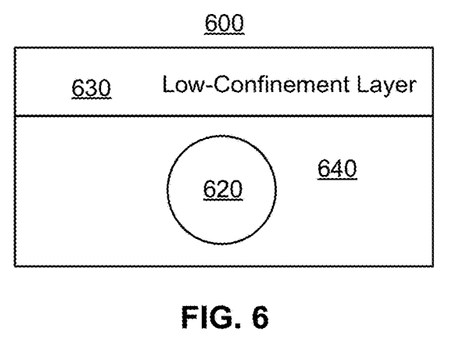
Figure 7:
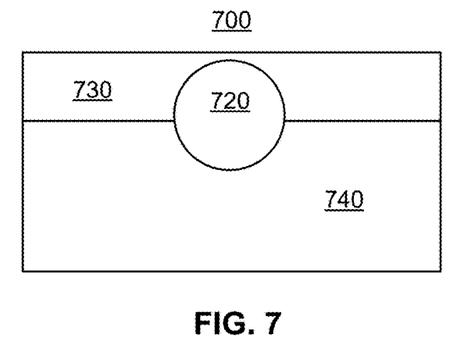
Figure 8:
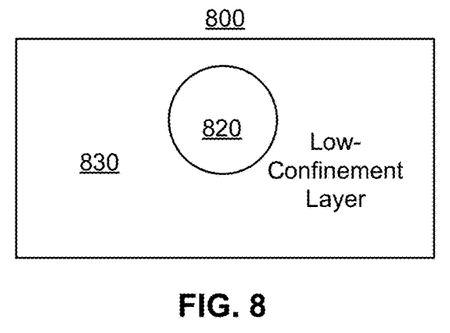
Figure 9:
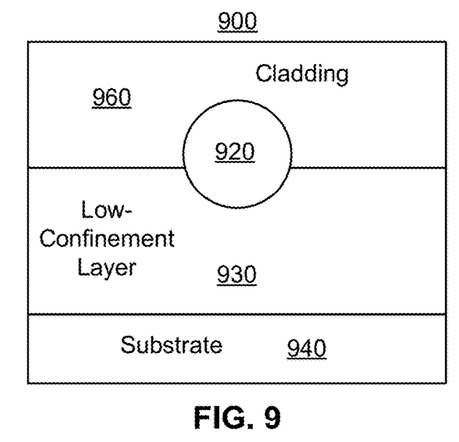

As can be seen in FIGS. 4-9, the low-confinement waveguide may have a variety of locations. Low-confinement waveguide 420 of FIG. 4 is completely within low-confinement layer 430. Low-confinement waveguide 520 is partially at the top surface of low-confinement layer 530 in FIG. 5. Thus, low-confinement waveguide 520 may contact the waveguide in such an embodiment. Low-confinement waveguide 620 is completely within substrate 640 in FIG. 6. In such embodiments, substrate 640 is desired to have a low index of refraction. For example, substrate 640 might be fused silica or quartz. Low-confinement waveguide 720 is partially within substrate 740 and partially within low-confinement layer 730 in FIG. 7. In such embodiments, substrate 740 is desired to have a low index of refraction. Low-confinement waveguide 820 of FIG. 8 is completely within low-confinement layer 830 and low-confinement layer 830 forms the substrate in FIG. 8. Low-confinement waveguide 920 of FIG. 9 is partially within low-confinement layer 930 and partially within cladding 960. Thus, low-confinement waveguide 960 need not be below (closer to substrate 940 than) the corresponding high-confinement waveguide (not shown in FIG. 9). Instead, some portion of low-confinement waveguide 920 may be at the same level as and/or above (further from substrate 940 than) the corresponding high-confinement waveguide.

Optical devices 400, 500, 600, 700, 800, and 900 function in an analogous manner to optical device(s) 100, 200 and/or 300. Thus, the benefits described herein may be achieved.

Figure 10:
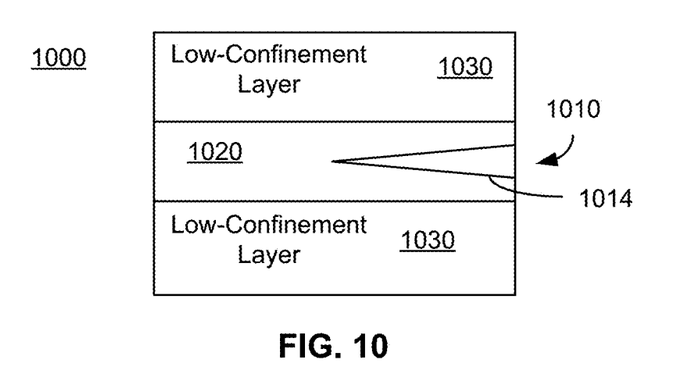
FIGS. 10-11 are diagrams depicting top views of embodiments of optical devices.
Figure 11:
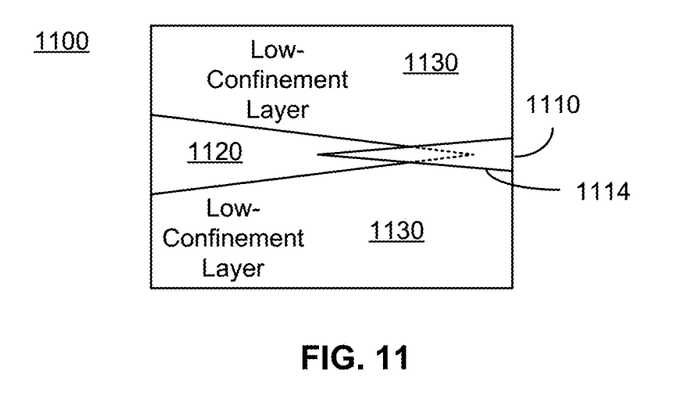
Figure 12A:
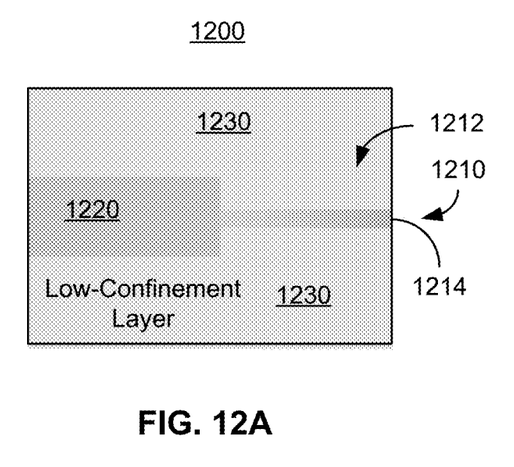
FIGS. 12A-12B are diagrams depicting top views of embodiments of optical devices.
Figure 12B:
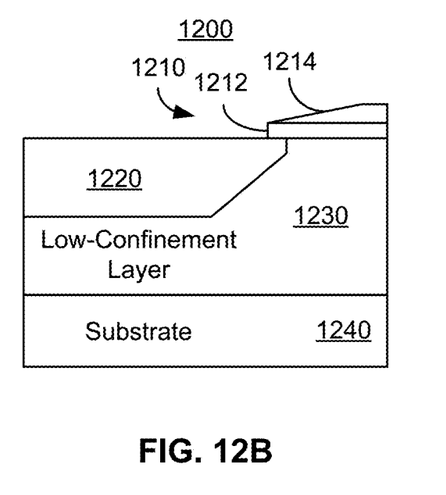

FIGS. 10, 11 and 12A depict top views of embodiments of optical devices 1000, 1100, and 1200 in the interaction region between the high-confinement waveguide and the low-confinement waveguide. FIG. 12B depicts a side cross-sectional view of optical device 1200 in the interaction region. FIGS. 10-12B are not to scale and only some portions of optical devices 1000, 1100, and 1200 are shown and/or labeled. Optical devices 1000, 1100, and 1200 are analogous to optical device(s) 100, 200 and/or 300.

Optical device 1000 includes low-confinement waveguide 1020, low-confinement layer 1030 and high-confinement waveguide 1010 that are analogous to low-confinement waveguide 120, low-confinement layer 130 and high-confinement waveguide 110, respectively. Optical device 1100 includes low-confinement waveguide 1120, low-confinement layer 1130 and high-confinement waveguide 1110 that are analogous to low-confinement waveguide 120, low-confinement layer 130 and high-confinement waveguide 110, respectively. Optical device 1200 includes low-confinement waveguide 1220, low-confinement layer 1230 and high-confinement waveguide 1210 that are analogous to low-confinement waveguide 120, low-confinement layer 130 and high-confinement waveguide 110, respectively.

In order to couple the high-confinement waveguide with the low-confinement waveguide, the structures are brought into close proximity to achieve mode overlap. In the coupling region, a combination of different low-index (i.e. low-confinement) waveguides may be used. For example, ion implanted or diffused waveguides may be used close to the surface. Such surface waveguides then couple to a laser written waveguide deeper in the low-confinement layer or substrate. In addition, as can be seen in FIGS. 10-12B, the coupling between the high-confinement waveguide and the low-confinement waveguide may have a variety of configurations. High-confinement waveguide 1010 of FIG. 10 has an inverse taper, while low-confinement waveguide 1020 does not. Both high-confinement waveguide 1110 and low-confinement waveguide 1120 may be tapered, as shown in FIG. 11. The thickness of the high-confinement waveguide 1210 may be reduced, as shown in FIGS. 12A-12B. Thus, coupling between the high-confinement (e.g. high-refractive index) waveguides and low-confinement (e.g. low-refractive index) waveguides may be achieved.

Optical devices 900, 1000, and 1100 function in an analogous manner to optical device(s) 100, 200 and/or 300. Thus, the benefits described herein may be achieved.

Various features and configurations of, optical devices 100, 200, 300, 400, 500, 600, 700, 800, 900, 1000, 1100 and 1200 have been shown. The features and configurations optical devices 100, 200, 300, 400, 500, 600, 700, 800, 900, 1000, 1100 and 1200 may be combined in manners not explicitly described herein. Further, optical devices 100, 200, 300, 400, 500, 600, 700, 800, 900, 1000, 1100 and 1200 may have a variety of configurations, including but not limited to those shown herein.

Figure 13:
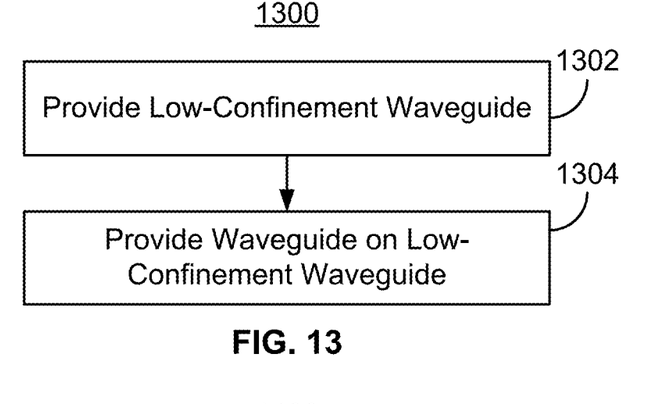
FIG. 13 is a flow chart depicting an embodiment of a method for providing an optical device.

FIG. 13 is a flow chart depicting an embodiment of method 1300 for providing an optical device. Method 1300 is described in the context of processes that may have sub-processes. Although described in a particular order, another order not inconsistent with the description herein may be utilized.

The low-confinement waveguide is provided, at 1302. The low-confinement waveguide may be provided in a substrate and/or in a low-confinement layer provided on the substrate. The waveguide is provided by modifying the properties of the underlying layer(s) to control the index of refraction. For example, direct femto-second laser writing, doping, ion implantation, ion diffusion, varying the stoichiometry and/or other techniques may be used. The waveguide is provided on the low-confinement waveguide, at 1304. For example, a LN layer may be provided on the substrate and the LN layer processed to form the waveguide.

For example, low-confinement waveguide 120 may be formed in low-confinement layer 130, at 1302. Waveguide 110 may then be formed on low-confinement waveguide 120 and/or low-confinement layer 130. Fabrication may then be completed. Thus, optical device 100, and other optical devices having the benefits described herein may be fabricated.

Figure 14:
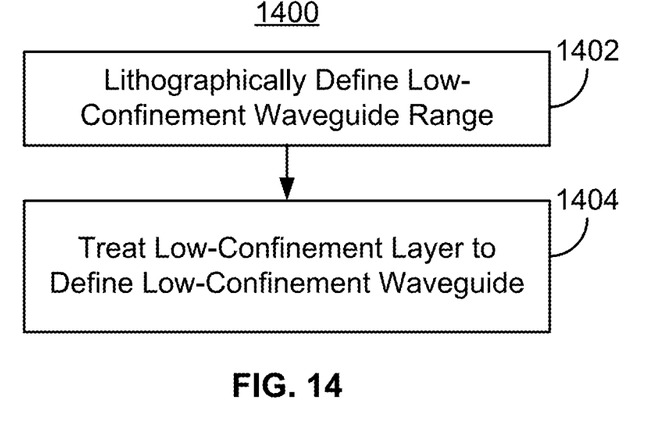
FIG. 14 is a flow chart depicting an embodiment of a method for providing a low-confinement waveguide.

FIG. 14 is a flow chart depicting an embodiment of method 1400 for providing an optical device. More specifically, method 1400 describes a technique for providing a low-confinement waveguide. Method 1400 is described in the context of processes that may have sub-processes. Although described in a particular order, another order not inconsistent with the description herein may be utilized.

A region of the low-confinement layer is defined photolithographically, at 1402. For example, a mask may be formed. The mask may have an aperture in the region of at which the low-confinement waveguide may be provided. The low-confinement layer is treated to modify (e.g. increase) the index of refraction, at 1404. Thus, the low-confinement waveguides is defined at 1404. For example, ion diffusion(s), ion implantation(s) and/or doping may be used. In some embodiments, such as for direct laser writing, the region for which the index of refraction is to be modified may be defined in another manner. In such embodiments, 1402 may be omitted.

For example, a mask having an aperture above the region corresponding to low-confinement waveguide 120 may be formed in low-confinement layer 130, at 1402. An ion implantation may then be performed. Thus, low-confinement waveguide 120 may be provided. Fabrication may then be completed. Thus, optical device 100, and other optical devices having the benefits described herein may be fabricated.

Figure 15:
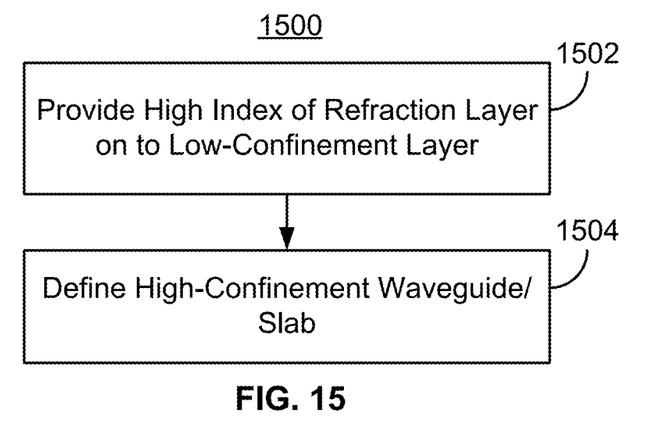
FIG. 15 is a flow chart depicting an embodiment of a method for providing a waveguide.

FIG. 15 is a flow chart depicting an embodiment of a method for providing a waveguide. Method 1500 is described in the context of processes that may have sub-processes. Although described in a particular order, another order not inconsistent with the description herein may be utilized.

A high index of refraction layer, such as LN, is provided on the low-confinement waveguide, at 1502. The slab layer and high-confinement waveguide are defined from the layer, at 1504. For example, a mask covering a portion of the high index of refraction layer corresponding high-confinement waveguide 110 may be formed in low-confinement layer 130, at 1502. The high index of refraction layer may then undergo one or more etches to define the high-confinement waveguide 114 and slab layer 112.

Thus, high-confinement waveguide 110 may be provided. Fabrication may then be completed. Thus, optical device 100, and other optical devices having the benefits described herein may be fabricated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An optical device configured to be coupled with an optical fiber, comprising:
   a waveguide including a high-confinement waveguide, the high-confinement waveguide having a first index of refraction and including lithium;
   a low-confinement waveguide optically coupled with the high-confinement waveguide, at least a portion of the low-confinement waveguide having a second index of refraction less than the first index of refraction, the low-confinement waveguide having a thickness of at least a mode diameter in a portion of the optical fiber, the low-confinement waveguide having an outer surface, the high-confinement waveguide being external to the outer surface of the low-confinement waveguide, a portion of the waveguide being on the low-confinement waveguide; and
   a low-confinement layer adjacent to a portion of the low-confinement waveguide, the low-confinement layer having a third index of refraction less than the second index of refraction.

2. The optical device of claim 1, wherein the waveguide further includes:
   a slab layer between the high-confinement waveguide and the low-confinement layer, the slab layer having a slab index of refraction greater than the second index of refraction.

3. The optical device of claim 1, wherein the waveguide includes an inverse taper.

4. The optical device of claim 1, wherein the low-confinement waveguide includes a taper.

5. The optical device of claim 1, wherein the low-confinement layer has a layer thickness of at least three multiplied by the mode diameter.

6. The optical device of claim 1, wherein at least a first portion of the low-confinement waveguide includes at least one of doped silicon oxide, silicon oxynitride, and titanium doped glass, the low-confinement layer includes at least one of quartz, silicon dioxide, fused silica, and doped fused silica and wherein the high-confinement waveguide includes at least one of lithium niobate, lithium tantalate, silicon and silicon nitride.

7. The optical device of claim 1, wherein at least a first portion of the low-confinement waveguide is in the low-confinement layer, the optical device further comprising:
   a substrate, the low-confinement layer residing between the substrate and the high-confinement waveguide.

8. The optical device of claim 7, wherein an additional portion of the low-confinement waveguide resides in the substrate.

9. The optical device of claim 1, wherein at least a first portion of the low-confinement waveguide is above the high-confinement waveguide.

10. The optical device of claim 1, wherein the low-confinement waveguide is a varying distance from the high-confinement waveguide.

11. The optical device of claim 1, wherein the low-confinement waveguide further includes:
    a facet configured to be connected with the optical fiber, the low-confinement waveguide being aligned with an end surface of the optical fiber at the facet.

12. An optical device, comprising:
    an optical fiber configured to transmit an optical signal having a mode diameter in a portion of the optical fiber proximate to a mode converter; and
    the mode converter optically coupled to the optical fiber, the mode converter including a waveguide and a low-confinement waveguide, the waveguide including a high-confinement waveguide and a slab layer, the high-confinement waveguide having a first index of refraction and including lithium, at least a portion of the low-confinement waveguide residing between the high-confinement waveguide and a low-confinement layer and having a second index of refraction less than the first index of refraction, the low-confinement waveguide having a thickness of at least the mode diameter, the low-confinement waveguide including a facet configured to be connected with the optical fiber, the low-confinement waveguide being aligned with an end surface of the optical fiber at the facet, the low-confinement waveguide having an outer surface, the high-confinement waveguide being external to the outer surface of the low-confinement waveguide, a portion of the waveguide being on the low-confinement waveguide.

13. A method for providing an optical device configured to be coupled with an optical fiber, comprising:
    providing a waveguide including a high-confinement waveguide, the high-confinement waveguide having a first index of refraction and including lithium;

providing a low-confinement waveguide optically coupled with the high-confinement waveguide, at least a portion of the low-confinement waveguide having a second index of refraction less than the first index of refraction, the low-confinement waveguide having a thickness of at least a mode diameter in a portion of the optical fiber; and providing a low-confinement layer adjacent to a portion of the low-confinement waveguide, the low-confinement layer having a third index of refraction less than the second index of refraction, the low-confinement waveguide having an outer surface, the high-confinement waveguide being external to the outer surface of the low-confinement waveguide, a portion of the waveguide being on the low-confinement waveguide.

14. The method of claim 13, wherein the providing the waveguide further includes:

providing a slab layer, the slab layer being between the high-confinement waveguide and the low-confinement waveguide.

15. The method of claim 13, wherein the providing the low-confinement waveguide further includes:

photolithographically defining a region in the low-confinement layer; and treating the region in the low-confinement layer to modify the first index of refraction of the low-confinement layer.

16. The method of claim 15, wherein the treating includes at least one of ion diffusion, ion implantation and doping.

17. The method of claim 13, wherein the providing the low-confinement waveguide further includes:

laser writing a region in the low-confinement layer to modify the first index of refraction of the low-confinement layer.

18. The method of claim 13, wherein the providing the waveguide further includes:

providing a layer on the low-confinement waveguide;
defining a slab layer from the layer; and
defining the high-confinement waveguide from the layer.

19. The method of claim 13, wherein the low-confinement layer resides on a substrate and wherein the providing the low-confinement waveguide further includes:

defining an additional portion of the low-confinement waveguide in the substrate.

20. The method of claim 13, wherein the providing the low-confinement waveguide further includes:

providing the low-confinement waveguide at a varying distance from a slab layer.

* * * * *